(12) United States Patent
Duan et al.

(10) Patent No.: US 11,911,901 B2
(45) Date of Patent: Feb. 27, 2024

(54) TRAINING ARTIFICIAL NETWORKS FOR ROBOTIC PICKING

(71) Applicant: Embodied Intelligence, Inc., Berkeley, CA (US)

(72) Inventors: Yan Duan, Berkeley, CA (US); Haoran Tang, Emeryville, CA (US); Yide Shentu, Berkeley, CA (US); Nikhil Mishra, Irvine, CA (US); Xi Chen, Berkeley, CA (US)

(73) Assignee: Embodied Intelligence, Inc., Emeryville, CA (US)

( * ) Notice: Subject to any disclaimer, the term of this patent is extended or adjusted under 35 U.S.C. 154(b) by 130 days.

(21) Appl. No.: 17/014,558

(22) Filed: Sep. 8, 2020

(65) Prior Publication Data
US 2021/0069898 A1  Mar. 11, 2021

Related U.S. Application Data

(60) Provisional application No. 62/897,287, filed on Sep. 7, 2019, provisional application No. 62/897,282, filed on Sep. 7, 2019.

(51) Int. Cl.
*B25J 9/16* (2006.01)
*B25J 15/06* (2006.01)

(52) U.S. Cl.
CPC ............... *B25J 9/161* (2013.01); *B25J 9/163* (2013.01); *B25J 9/1612* (2013.01); *B25J 9/1653* (2013.01); *B25J 15/0658* (2013.01)

(58) Field of Classification Search
CPC . B25J 9/161; B25J 9/1612; B25J 9/163; B25J 9/1653; B25J 15/0658;
(Continued)

(56) References Cited

U.S. PATENT DOCUMENTS 10,906,188 B1 *  2/2021  Sun ..................... B25J 19/023
11,097,418 B2 *  8/2021  Nagarajan ............ B25J 9/1612
(Continued)

FOREIGN PATENT DOCUMENTS

WO      20190109336      6/2019

OTHER PUBLICATIONS

Matthew Matl et al: "Learning Robotic Grasping Policies for Suction Cups and Parallel Jaws Simulation", Electrical Engineering and Computer Sciences University of California at Berkeley; Aug. 16, 2019 (Year: 2019).*
(Continued)

*Primary Examiner* — Adam R Mott
*Assistant Examiner* — Elizabeth Rose Neleski

(57) ABSTRACT

Various embodiments of the present technology generally relate to robotic devices and artificial intelligence. More specifically, some embodiments relate to an artificial neural network training method that does not require extensive training data or time expenditure. The few-shot training model disclosed herein includes attempting to pick up items and, in response to a failed pick up attempt, transferring and generalizing information to similar regions to improve probability of success in future attempts. In some implementations, the training method is used to robotic device for picking items from a bin and perturbing items in a bin. When no picking strategies with high probability of success exist, the robotic device may perturb the contents of the bin to create new available pick-up points. In some implementations, the device may include one or more Computer-vision systems.

20 Claims, 6 Drawing Sheets

(58) Field of Classification Search
CPC ...... G06N 3/0454; G06N 3/08; G06N 3/0472; G05B 2219/40014; G05B 2219/40053; G05B 2219/45063
See application file for complete search history.

(56) References Cited

U.S. PATENT DOCUMENTS

| | | | |
|---|---|---|---|
| 2010/0092032 A1* | 4/2010 | Boca | B25J 9/1679 348/222.1 |
| 2011/0098859 A1 | 4/2011 | Irie et al. | |
| 2011/0223001 A1 | 9/2011 | Martinez et al. | |
| 2015/0039129 A1 | 2/2015 | Yasuda et al. | |
| 2017/0136632 A1 | 5/2017 | Wagner et al. | |
| 2019/0070734 A1 | 3/2019 | Wertenberger et al. | |
| 2019/0071261 A1 | 3/2019 | Wertenberger et al. | |
| 2019/0213481 A1 | 7/2019 | Godard et al. | |
| 2020/0013176 A1 | 1/2020 | Kang et al. | |
| 2020/0017317 A1* | 1/2020 | Yap | G06Q 10/08 |
| 2020/0156266 A1 | 5/2020 | Curhan et al. | |
| 2021/0069904 A1 | 3/2021 | Duan et al. | |
| 2021/0237266 A1 | 8/2021 | Kalashnikov et al. | |
| 2022/0032463 A1 | 2/2022 | Schneider et al. | |

OTHER PUBLICATIONS

Andy Zeng et al: "Robotic Pick-and-Place of Novel Objects in Clutter with Multi-Affordance Grasping and Cross-Domain Image Matching", 2018 IEEE International Conference On Robotics and Automation (ICRA), May 1, 2018 (Year: 2018).*
Matthew Matl et al: "Learning Robotic Grasping Policies for Suction Cups and Parallel Jaws Simulation", Electrical Engineering and Computer Sciences University of California at Berkely, Aug. 16, 2019 (Year: 2019).*
Andy Zeng, et al; Robotic Pick-and-Place of Novel Objects in Clutter with Multi-Affordance Grasping and Cross-Domain Image Matching; 2018 IEEE International Conference on Robotics and automation; May 1, 2018; 11 pages.
International Search Report and Written Opinion for PCT/US2020/049705, filed Sep. 8, 2020, dated Dec. 9, 2020; 18 pages.
Matthew Matl, et al.; "Learning Robotic Grasping Policies for Suction Cups and Parallel Jaws in Simulation", Aug. 16, 2019; https://www2.eecs.berkeley.edu/Pubs/TechRpts/2019/EECS-2019-119.pdf; 58 pages.
Renaud Detry et al: "Generalizing grasps across partly similar objects", Robotics and Automation (ICRA), 2012 IEEE International Conference On, IEEE, May 14, 2012, 7 bages.
Shao, Quanquan, et al.; Suction Grasp Region Prediction Using Self-supervised Learning for Object Picking in Dense Clutter, 2019 IEEE 5th International Conference on Mechatronics System and Robots; May 3, 2019; 6 pages.
Shehan Caldera et al: Review of Deep Learning Methods in Robotic Grasp Detection, Multimodal Technologies and Interaction, vol. 2, No. 3, Sep. 7, 2018; 24 pages.
Alonso, Marcus; Current Research Trends in Robot Grasping and Bin Picking; International Joint Conference SOCO, Jun. 7, 2018; 10 pages.
Anas, Essa; Scene Disparity Estimation with Convolutional Neural Networks; SPIE, vol. 11059 Jun. 21, 2019; 9 pages.
International Preliminary Report on Patentability for PCT Application No. PCT/US2020/049702; dated Mar. 17, 2022; 13 pages.
International Preliminary Report on Patentability for PCT Application No. PCT/US2020/049703; dated Mar. 17, 2022; 12 pages.
International Preliminary Report on Patentability for PCT Application No. PCT/US2020/049704; dated Mar. 17, 2022; 9 pages.
International Preliminary Report on Patentability for PCT Application No. PCT/US2020/049705; dated Mar. 17, 2022; 10 pages.
International Search Report and Written Opinion for PCT/US2020/049704, filed Sep. 8, 2020; dated Dec. 4, 2020; 16 pages.
International Search Report and Written Opinion for PCT/US2020/049702, filed Sep. 8, 2020, dated Dec. 4, 2021; 19 pages.
International Search Report and Written Opinion for PCT/US2020/049703, filed Sep. 8, 2020, dated Dec. 4, 2021; 17 pages.
Olson, Elizabeth A.; Synthetic Data Generation for Deep Learning of Underwater Disparity Estimation, OCEANS 2018 MTS/IEEE; Oct. 22, 2018; 6 pages.
Laga, Hamid; A Survey on Deep Learning Architectures for Image-based Depth Reconstruction; Jun. 14, 2019; 28 pages.
Levine, Sergey, Learning Hand-Eye Coordination for Robotic Grasping with Deep Learning and Large-Scale Data Collection; ARVIX, vol. 1603.02199, Apr. 2, 2016; 12 pages.
Eitel, A., et al., "Learning to Singulate Objects using a Push Proposal Network", arXiv, Feb. 5, 2018 (Year: 2018).

* cited by examiner

TRAINING ARTIFICIAL NETWORKS FOR ROBOTIC PICKING

CROSS-REFERENCE TO RELATED APPLICATIONS

This application is related to and claims priority to U.S. Provisional Patent Application No. 62/897,282, entitled "APPLICATION FOR PATENT," filed on Sep. 7, 2019 and to U.S. Provisional Patent Application No. 62/897,287, entitled "APPLICATION FOR PATENT," filed on Sep. 7, 2019, which are incorporated by reference herein in their entirety.

TECHNICAL FIELD

Various embodiments of the present technology generally relate to the field of robotic devices and artificial intelligence. More specifically, embodiments include a method of training artificial neural networks.

BACKGROUND

The field of robotics has grown dramatically in recent decades. Robots can be physical machines capable of carrying out certain computer programs to perform tasks. Robots and similar manipulator systems are commonly used in many commercial and industrial settings for precise or repetitive movements. Robots may be used to pick and place parts, weld, access locations too difficult or unsafe for humans to reach, and assist humans in many other applications.

In order for a machine to perform in a truly useful manner, it should be able to sense or perceive at least some aspects of what's going on around it and apply that knowledge to future decisions. Machines solely programmed to repeat a task or action, encounter issues or frequently get stuck, thus requiring human intervention and sometimes defeating the purpose of having a robot at all. Robots and machines are often guided with some level of computer vision. Computer vision allows a system to gain an understanding of its environment from digital images, videos, scans, and similar visual mechanisms. High-level vision systems must be used such that a machine can accurately acquire, process, and analyze data from the real world. Machine learning techniques allow a machine to receive input and generate output based on the input. Some machine learning techniques utilize deep artificial neural networks having one or more hidden layers for performing a series of calculations leading to the output.

Artificial neural networks, modeled loosely after the human brain, learn mapping functions from inputs to outputs and are designed to recognize patterns. A deep neural network comprises an input layer and an output layer, with one or more hidden layers in between. The layers are made up of nodes, in which computations take place. Various training methods are used to train an artificial neural network that uses optimization to continually update weights at the various nodes based on failures until a satisfactory model is achieved. Many types of deep neural networks currently exist and are used for a broad variety of applications and industries including computer vision, series forecasting, automated driving, performing medical procedures, aerospace, and many more. One advantage of deep artificial neural networks is their ability to learn by example, rather than needing to be specifically programmed to perform a task, especially when the tasks would require an impossible amount of programming to perform the operations they are used for today.

The information provided in this section is presented as background information and serves only to assist in any understanding of the present disclosure. No determination has been made and no assertion is made as to whether any of the above might be applicable as prior art with regard to the present disclosure.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the present technology generally relate to a method of training artificial neural networks without the need for extensive, time-consuming training data. The method includes, in some implementations, attempting a task with a robotic device, wherein the robotic device fails the attempt. The method further includes generalizing information related to the failed attempt and transferring the generalized information related to the failed attempt to similar scenarios. The generalized information includes information about similar scenarios that may also cause failure. After transference and generalization, the robotic device attempts the task again. The robotic device may repeat this process until success or may continue even after success.

Various embodiments of the present technology include implementations for robotic devices. In some examples, a robotic device for picking items from a bin and perturbing items in a bin is trained using the method described herein. The robotic device includes a picking element and a perturbation element. In some embodiments the robotic device is a robotic arm having the picking element and the perturbation element coupled to the robotic arm. The picking element may be used to pick up items in the bin. The perturbation element may be used to blow high-pressure air into the bin in order to perturb the contents of the bin. Perturbation may be performed when no picking options exist with reasonable probabilities of success. In some implementations, the robotic device may include or more computer-vision systems.

In an embodiment of the present technology, a method for training an artificial neural network comprises performing, with a robotic picking device, an attempt to pick up an item in the bin at a first region on the item. The method further comprises, in response to determining that the attempt failed, generalizing information about the first region, transferring the generalized information about the first region to one or more other regions on the item having at least one matching characteristic to the first region, and identifying a second region on the item to attempt to pick up the item from, wherein the second region is distinct from the one or more other regions. The method further comprises performing, with the robotic picking device, a second attempt to pick up the item in the bin at the second region on the item.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
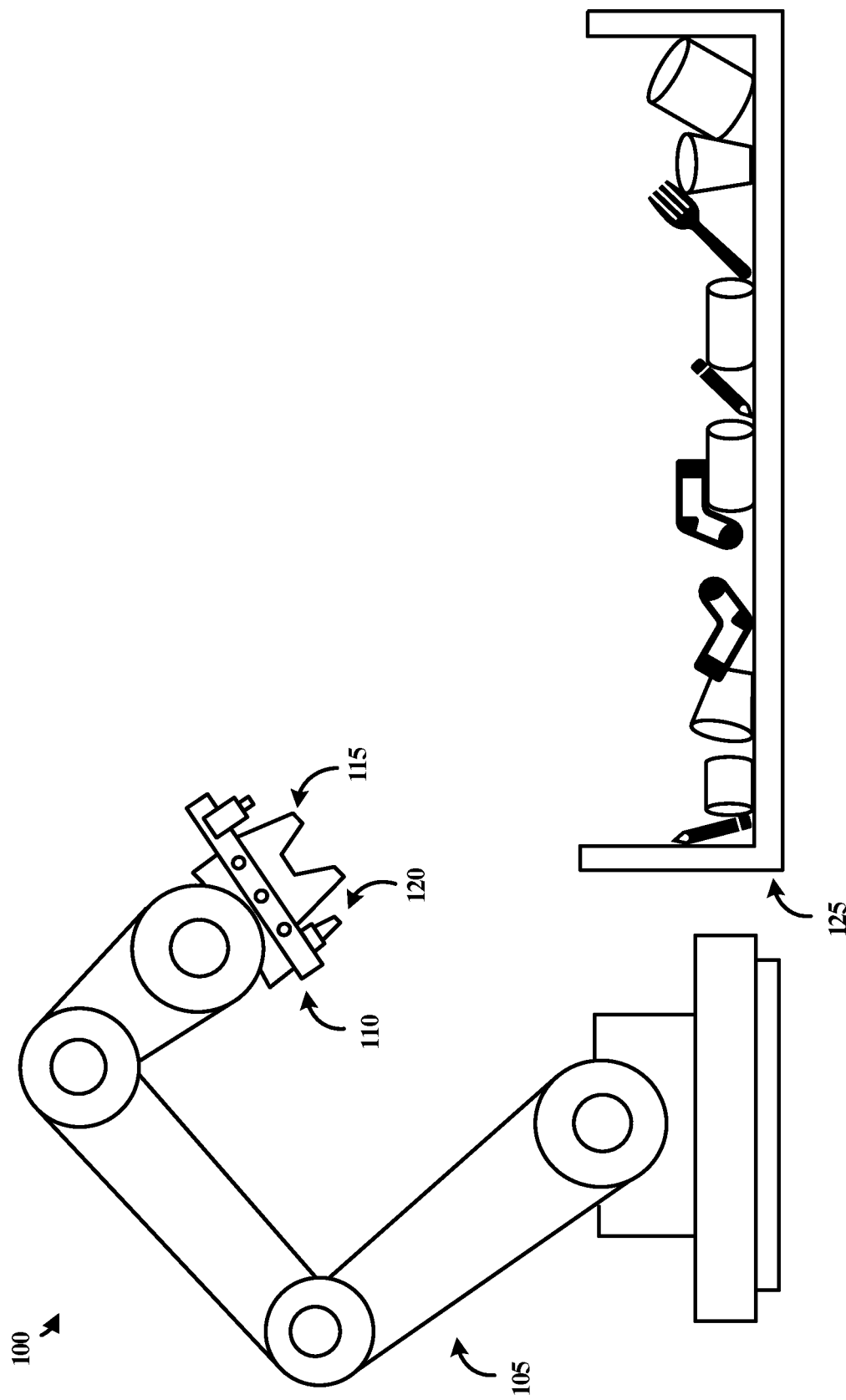
FIG. 1 illustrates an example of a robotic arm for picking and perturbing items in a bin in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Robots may be programmed to perform a variety of tasks, including grasping, picking, and moving. However, with traditional programming methods, a robot must be told exactly what to do for every single movement. While robots continue to grow and replace repetitive, laborious, unsafe, or otherwise undesirable human tasks, they continually fall short of performing tasks that cannot be directly coded into a program and require at least some level of intuition. An intelligent robot may be able to perceive and perform more like a human would through various learning techniques, rather than following pre-programmed trajectories.

An autonomous robot should be able to perceive and recognize the environment around it and process that information to come up with a way to perform a task. Thus, if a robot is picking items out of a bin, it should be able to sense the location and position of a specific item and apply that to determine how to pick up the item and move it to a desired location. A robot capable of sensing and applying that knowledge, even within highly repetitive settings, dramatically decreases the need for human intervention, manipulation, and assistance. Thus, human presence may no longer be required when items aren't perfectly stacked or when a robot gets stuck, as a few examples. If a robot regularly gets stuck, it may defeat the purpose of having a robot altogether, because humans may be required to frequently assist the robot.

Furthermore, robots already designed to complete industrial or commercial tasks, such as robots configured to pick items out a bin, face many issues. Even with the most advanced robotic arms and the ability to sense and make decisions, robots fall short of completing tasks such as picking every item out of a bin for various reasons. Challenges include awkwardly shaped items, difficult spots or locations to reach within a bin (such as corners), a variety of item materials and sizes, and similar challenges or unknowns. In order to accurately guide a robotic system, advanced computer vision systems are required. A computer vision system should be able to provide a system with high-quality visual information that can be used to understand depth, geometries, distinct shapes or items, material properties, and more. Furthermore, each gripper presently used by robotic arms has some weaknesses in which it may not be able to grip certain items in certain situations. The infinite number of possible arrangements render it nearly impossible to guarantee that a robot would be able to pick up every single item in a bin every time. Based on the variety of challenges faced by present day robots, a new technique for picking and perturbing items in a bin with a robotic device is disclosed.

Thus, various embodiments of the present invention generally relate to a robot for performing tasks in addition to the systems and methods that control and train the robot. More specifically, some embodiments include a robot for intelligently perturbing and picking items out of a bin. A robot for picking elements out of a bin, in accordance with some embodiments of the technology, comprises two effectors: a picker element and a perturbation element. As previously mentioned, advanced machines for picking items from a bin, such as a robotic arm, can be very proficient at picking up most items, but fall short of being able to pick every item from a bin, in every position, every single time. This may be due, in part, to physical constraints or limitations in the design of a machine that cause certain angles and locations to be difficult to access. These limitations are also due to the wide variety of materials and positions an item may be in. Thus, in addition to a picker element that can pick items out of a bin and move them to a new location, a perturbation element is included on the robotic device. In certain embodiments, the robotic device is a robotic arm having a suction-based picking element and high-pressure air-based perturbation element.

The perturbation element, in accordance with the present technology, perturbs a present arrangement of items within a bin. The robotic device may include one or more mechanisms of perturbation. In certain implementations, the perturbation element is a compressed air valve. The robot may use the compressed air valve to blow high-pressure air into a bin in order to rearrange one or more items in the bin. By perturbing the items in the bin, the items may move such that they can then be picked up from a different position. Perturbation may occur in a general or targeted manner. For example, in a general perturbation strategy, the robot may blow compressed air into the bin continuously, following a trajectory around the edge of the bin. In this manner, most or all of the items in the bin may move as a result of being blown around by the compressed air. After the perturbation is complete, the robot may then re-assess the arrangement of items in the bin and re-attempt to pick up an item. In other implementations, the perturbation element may be used without being coupled to a picking element. In such cases, the perturbation element may be useful for perturbing objects for purposes other than picking.

Alternatively, the robot may perturb an item in a bin in a targeted manner. In a targeted perturbation strategy, the robot may blow compressed air, in a discrete or continuous manner, or physically touch an item, in order to perturb the specific item in a specific or non-specific way. For example, if a marker is standing upright in the corner of a bin, many types of picking elements may struggle to grab the marker due to its position. Thus, a perturbation element could knock the marker down onto its side to make it easier to pick up. If the perturbation element successfully knocks down the marker, it can then re-try to pick up the marker. If the perturbation element fails to knock down the marker, because it could only push it towards the corner, for example, the perturbation element might try an alternative approach. In a different attempt, the perturbation element may blow compressed air behind the marker into the back corner to get the marker to fall down or move away from the corner. If the perturbation element succeeds at moving the marker, it could then re-try to pick up the marker. If the perturbation element fails to move the marker, it may try another perturbation method. For example, in yet another perturbation attempt, the perturbation element may take a general, non-targeted approach wherein it continuously blows air around the inner perimeter of the bin. In this way, the perturbation element may effectively disturb the position of the marker through the general perturbation, and subsequently re-try to pick up the marker.

The machine may continue to attempt perturbing and picking up the marker in this manner until it succeeds. The perturbation techniques and strategies may exclude any mentioned approaches and methods, or may include additional approaches and methods, such as stirring, as one example. The order of operations in the previous example are presented solely for the purpose of explanation and are not intended to limit the actual series of operations, limit the number of steps, or limit the types of perturbation approaches. The actual order of operations may vary, including but not limited to having fewer steps, having additional steps, having additional methods, having different orders of steps and methods, or similar variations thereof.

The picking element may comprise one or more different types of picking mechanisms including but not limited to a pinching mechanism, a gripping mechanism, a grabbing mechanism, a robotic hand, a parallel plate mechanism, a suction or vacuum mechanism, a magnet or a magnetic mechanism, or similar mechanisms capable of picking items. In an exemplary embodiment of the present technology, a robotic arm comprises a suction mechanism for picking items from a bin (i.e., the picking element) and a compressed air valve for perturbing elements in the bin (i.e., the perturbation element). Although the suction mechanism can pick up objects of many different shapes, sizes, orientations, and materials, it may still not be able to pick up certain items due to positional limitations, material limitations, and similar item or device-related limitations. Thus, the perturbation element may reposition objects, via compressed air or touch, such that picking can be achieved.

For example, if the picking device (i.e., the robotic arm and suction element) needs to pick up a pair of socks from a bin, it may not be able to directly pick the socks because their porous fabric does not enable a vacuum to form between them and the suction element. However, the socks may include a tag attached to them that the picker could successfully grab with the suction element. Thus, if the tag is showing, the machine may recognize that it should attempt to pick up the socks by their tag and proceed to do so. If the attempt fails, or if the tag is not visible to the machine, the machine may initiate a perturbation sequence. For example, the machine may recognize, due to the position of the socks, that blowing a targeted pulse of compressed air towards the socks is most likely to successfully perturb the socks. The machine would therefore attempt the determined perturbation. After the perturbation attempt, the machine reassesses the bin for items that it might be able to successfully pick up. If the tag of the socks is showing, the machine may re-try to pick up the socks using the suction element to grab the tag. If the attempt is successful, the machine can move on to another item with the next highest probably of picking success. If the attempt is unsuccessful, the machine may move on to another item in the meantime or re-initiate a perturbation sequence. The perturbation sequence may be a similar technique to the first attempt, or may be a different technique, such as a general bin perturbation.

In some embodiments, the machine may follow a predetermined series of steps when assessing bin arrangement, determining which items to attempt to pick, determining likelihood of success, determining how to pick an item, determining when and how to perturb an item or items, or additional steps. In alternative embodiments, the machine may make decisions on the most appropriate series of steps for each situation, rendering each sequence subject to be partially or entirely different from a previous sequence or any exemplary sequences provided herein.

The technology described herein should not be limited to picking and perturbing items in only bins. The present technology has many applications in which a mechanism for picking and perturbating items or objects is useful. In some examples, the robotic device described herein may be used to pick and perturb items within any region accessible to the robotic device such as flat surfaces, conveyor belts, piles of items, and other locations or scenarios. The region may comprise walls or barriers, similar to a bin, or may not comprise any defined boundaries. In some examples, the robotic device herein may be used to pick and perturb items in an area similar to a bin such as a tub, a box, a bucket, a crate, a bed, or similar regions to those listed. A bin is used in many examples included herein for purposes of explanation and clarity, but the present technology is useful for many other types of regions and those uses are anticipated.

FIG. 1 illustrates an example of commercial environment 100 having a robotic arm for picking and perturbing items in a bin in accordance with some embodiments of the present technology. FIG. 1 includes robotic arm 105 and bin 125. Robotic arm comprises vision system 110, picking element 115, and perturbation element 120. Bin 125 is holding a variety of items that may be found in a warehouse, commercial setting, or industrial setting including pencils, cans, cups, socks, and utensils. Many other types of items may be in a bin for picking in accordance with the present disclosure. In the present example, robotic arm 105 is a six-degree-of-freedom (6DOF) robotic arm. Picking element 115 and perturbation element 120 are designed for picking all the items out of bin 125 and moving them to a different location. In certain implementations, the robotic arm may pick each item one at a time and sort the items into their respective, sorted locations.

Picking element 115 may comprise one or more picking mechanisms for grabbing items in bin 125. Picking mechanisms may include a suction mechanism, a gripping mechanism, a robotic hand, a pinching mechanism, a magnet, or any other picking mechanism that may be used in accordance with the present disclosure. In some examples, picking element 115 may additionally be used for perturbation, such as poking, touching, stirring, or otherwise moving any items in bin 125, as just a few examples. Robotic arm 105 may move and position picking element 115 such that it is able to pick up an item in bin 125. In certain embodiments, determining which item to pick up and how to pick it up is determined using a deep artificial neural network. The deep neural network (DNN) may be trained to guide item pick-up and determine which items have the greatest probabilities of pick-up success. In other embodiments, picking may be guided by a program that does not use a DNN for decision making.

Perturbation element 120, in the present example, is a pneumatic air valve connected to a pneumatic air supply, wherein the pneumatic air valve blows compressed air into bin 125 in certain situations. Perturbation element 120 may be used in situations where the DNN or another model determines that there is low probability that it will be able to pick up any items in bin 125 with picking element 115 as they are presently arranged. In some examples, the robotic arm may have already tried and failed to pick every visible item in the bin, and therefore decides to initiate a perturbation sequence. Perturbation may be conducted in a general or targeted manner as well as in a continuous or discrete manner. During perturbation, perturbation element 120 may disturb the present arrangement of items in bin 125 by blowing compressed air into bin 125. Compressed air may be blown into a specific spot of bin 125 in an attempt to move a specific item. Compressed air may otherwise be blown into the entire bin in a generic pattern, at a random spot in the bin, or in any other manner that may disturb the present arrangement of items.

Vision system 110 may comprise any number of visual instruments, such as cameras or scanners, in order to guide motion, picking, and perturbation. Vision system 110 receives visual information and provides it to a computing system for analysis. Based on the visual information provided by vision system 110, the system can guide motions and actions taken by robotic arm 105. Vision system 110 may provide information that can be used to decipher geometries, material properties, distinct items, bin boundaries, and other visual information related to picking items from a bin. Based on this information, the system may decide which item to attempt to pick up and can then use vision system 110 to guide robotic arm 105 to the item. Vision system 110 may also be used to decide that items in the bin should be perturbed in order to provide a higher probability of picking success. In the present example, vision system 110 is mounted to robotic arm 105. However, vision system 110 may be in any other location that it can properly view bin 125 from, either on or off of robotic arm 105. In some examples, visions system 110 may be mounted to a stationary component from which it can view bin 125, separate from the robotic device.

Figure 2:
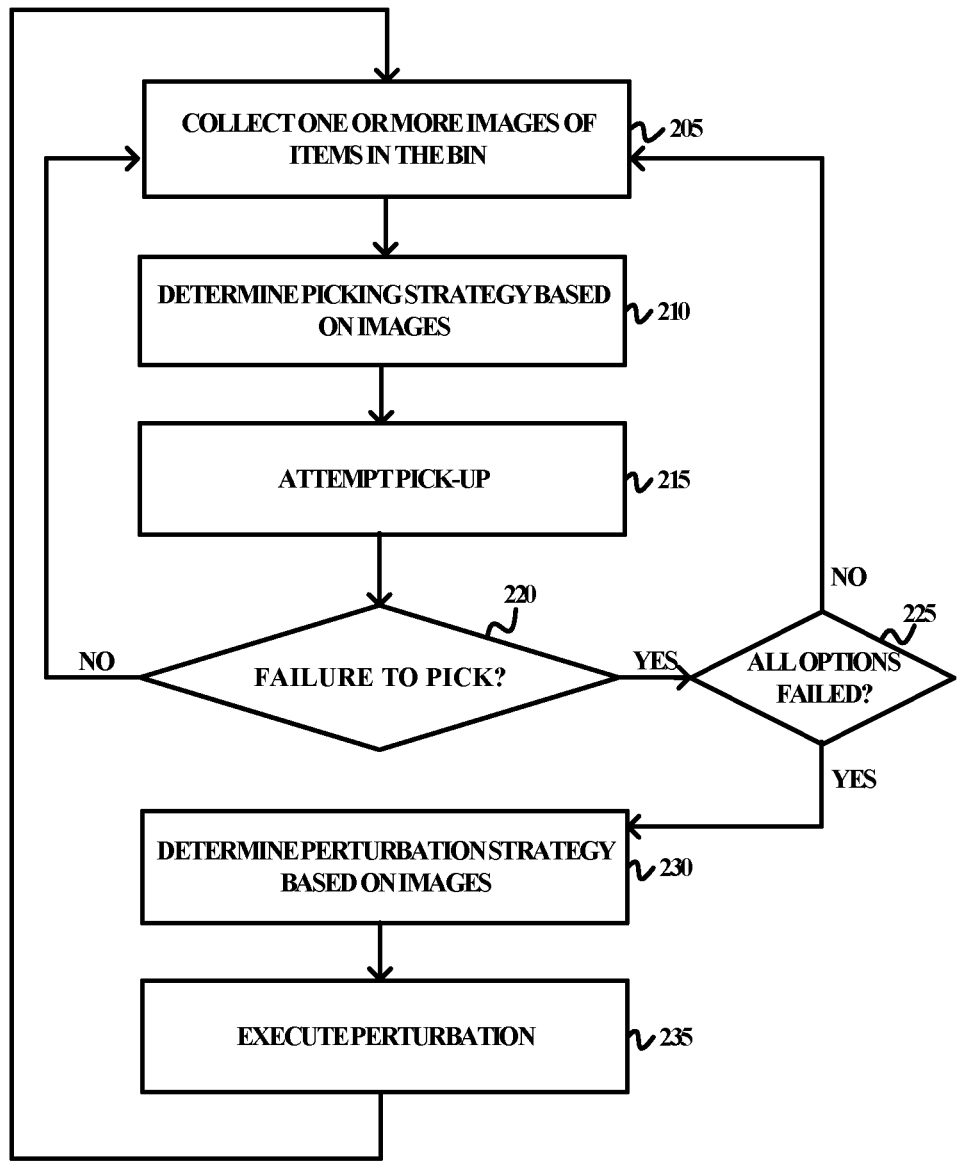
FIG. 2 is a flow chart illustrating an exemplary series of operations for picking and perturbing items in a bin in accordance with some embodiments of the present technology.

FIG. 2 is a flowchart illustrating an exemplary set of operations that a machine may use to pick items from a bin in accordance with some embodiments of the present technology. In step 205, the machine collects one or more images of the contents of the bin. The machine may use visual sensing, imaging, scanning, or any other type of computer-based vision helpful for identifying items in the bin. In some examples, the machine takes one or more images using at least one camera to see the arrangement of items in the bin. The machine may use a 3D camera, a red-green-blue (RGB) camera, a similar camera, or variations or combinations thereof to image the contents of the bin. In the present example, the machine comprises a 6DOF robotic arm having a vacuum element and a compressed air valve.

In step 210, the machine uses data collected in step 205 to determine a picking strategy. The picking strategy may be chosen based on the number of items in the bin, material properties of items in the bin, the arrangement of items in the bin, or similar qualities or combinations thereof. Based on these qualities, the probability of success for picking up various items and a picking strategy for each item can be determined. The picking strategy may include the order of items to be picked up, how each item is picked up, where on each of the items to pick them up from, direction or orientation from which to pick them up, or variations and combinations thereof. The proposed picking strategy may include any movement or position within the 6DOF range of the robotic device.

Once a picking strategy has been determined, the machine attempts to pick up an item in step 215. The attempt is based on the picking strategy determined in step 210. If the robotic arm successfully picks the item, it may move the item to another location according to the needs of the scenario. The machine may then attempt to pick the next item, in some examples. In step 220, the machine determines if it failed to pick up the item. The machine may recognize that an item was not picked based on failure to create a vacuum from not picking the item at all, from loss of vacuum if the item was dropped, or another factor based on the picking method being used. If the machine determines that the item was not successfully picked up and moved, it may then determine if all options in the bin have been exhausted. If there are remaining viable options for pick up, the machine may return to step 215 and attempt to pick up a different item. If there are no more good options to try to pick up, the machine may move to step 230. After determining if the machine failed to pick up the item or not, information related to the attempt may be stored in memory to be used in future decision making or attempts. Information may be stored based on a failed attempt or a successful attempt. The information may then be accessible for use on the next attempt or may be used to reason about what action to perform next, in some examples.

In step 230, the machine determines a perturbation strategy based on images. The images may be the same images used in step 205 or may be a new set of images collected specifically for the perturbation analysis. The data may similarly be collected via a camera or similar sensing or imaging methods as previously discussed. Based on the images, the machine may use information related to the relative positions of items, the number of items, the material properties of items, or other qualities relevant to perturbation methods and combinations thereof. The machine may pick a perturbation strategy such as a targeted or general strategy, continuous or discrete, physical touch or compressed air, and similar options relevant to perturbation. The machine may use its robotic arm to blow air into the bin, stir the bin, knock items down, touch items, or use similar disturbance or perturbation methods or combinations thereof. After determining the perturbation strategy that the machine will use, the machine executes the perturbation strategy in step 235. The machine may subsequently return to step 205 after perturbation, in some examples. After perturbing the arrangement in the bin, information related to the attempt may be stored in memory to be used in future perturbations. The information may then be accessible for use on the next attempt or for future decision making. For example, the perturbation strategy may be stored such that it can correlate failure or success in the next round of picking with the perturbation strategy or may be used to reason about what action to take next.

In some scenarios, choosing a picking or perturbation strategy is based on pre-defined protocols. In this manner, the machine may be able to try a series of different methods until it is successful. The pre-determined protocols may be used based on the various inputs such as images. In these approaches, a general set of logic controls may be used to determine what strategy to try next. However, in some embodiments choosing a picking or perturbation strategy may be based on machine learning techniques. The machine learning techniques may be implemented within numerous parts of the robotic picking and robotic perturbation process. Deep neural nets may be implemented and trained for the purposes of determining when, where, what, and how the effectors (i.e., the picker element and the perturbation element) pick and perturb items. Using deep neural nets for the purposes of generating effector logic may allow the machine to adapt to any situation, arrangement, item type, and other scenarios by learning from previous failures and continually improving or refining the techniques used. Reinforcement learning, imitation learning, supervised learning, un-supervised learning, and any other types of machine learning or combinations thereof may be used for operating the machines and methods described herein.

Figure 3:
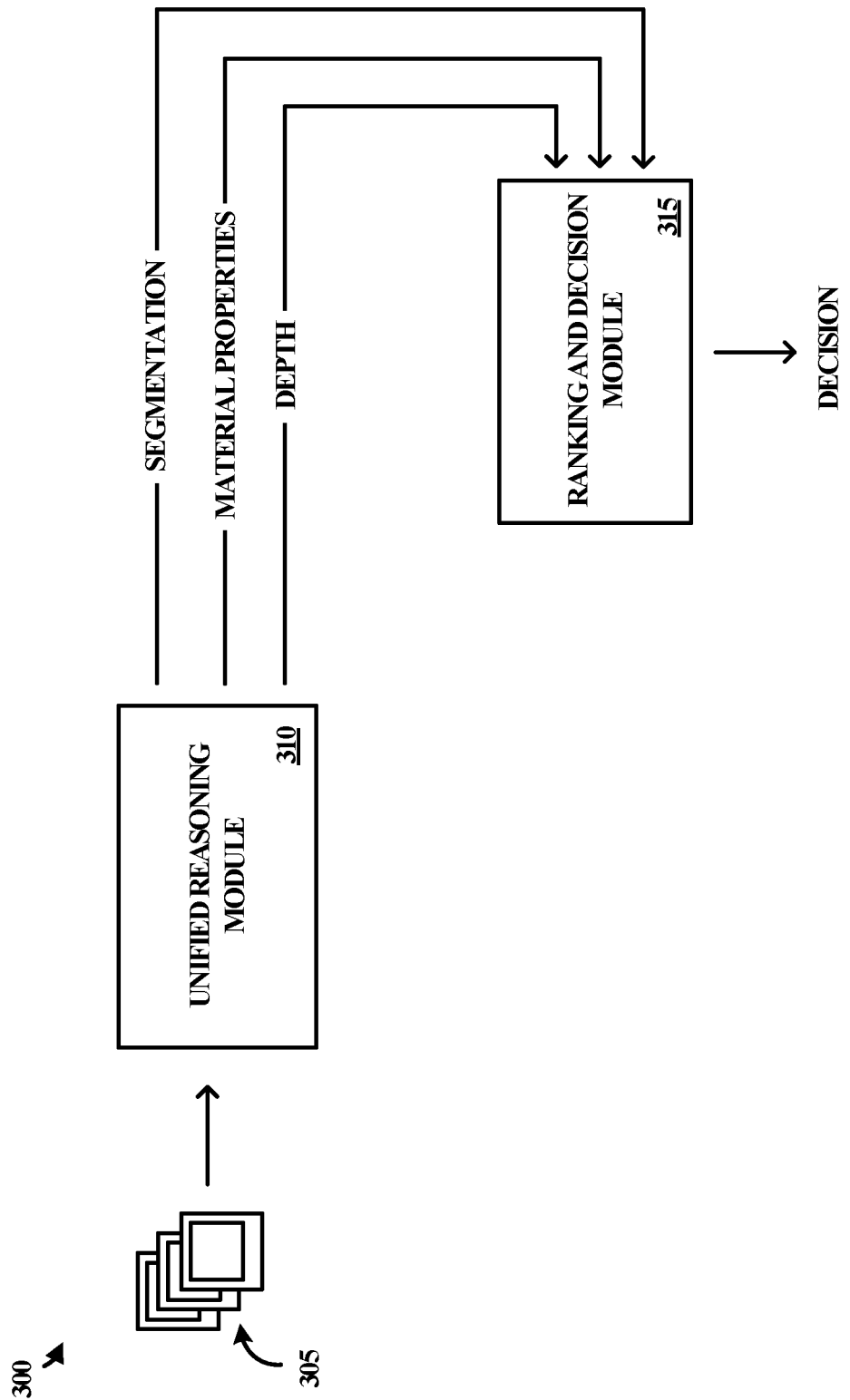
FIG. 3 illustrates an image processing and reasoning environment for guiding a robot to pick up items from a bin in accordance with some embodiments of the present technology.

FIG. 3 illustrates an example flow within environment 300 in accordance with some embodiments of the present technology. In the present example, images 305 are used an input to and processed in unified reasoning module 310. Images 305 may be one or more images taken by an imaging or computer-vision system. In the present example, the picking and perturbation machine comprises a 6DOF robotic arm. Coupled to the 6DOF robotic arm is at least one camera, a suction valve (i.e., vacuum), and a compressed air valve. Images 305, in the present example, are collected by at least one camera coupled to the 6DOF robotic arm, as is exemplified in FIG. 1. The images are processed in unified reasoning module 310. In some examples, unified reasoning model comprises at least one deep neural network trained for analyzing images. In the present example, image analysis includes performing segmentation, deciphering material properties, and determining distances. However, fewer or additional image analysis processes may be included in unified reasoning module 310 and are anticipated.

Segmentation includes deciphering distinct objects in images 305. Segmentation may include a variety of sub-processes to assist in finding distinct objects. Understanding material properties of each distinct object may then be important for understanding the limitations regarding how an item can be picked up. Understanding the depth of each object may assist in segmentation and may also assist when it is time to approach and pick up an item with the robotic device. Although segmentation, material properties, and depth are illustrated as individual outputs for the purpose of illustration, the outputs of unified reasoning module 310 may be a single, unified model comprising information related to the various types of data discussed or a variation or combination of the outputted data.

The output or outputs of unified reasoning module 310 serves as input to ranking and decision module 315. Ranking and decision module 315 may process the unified model provided by unified reasoning module 310 to produce a ranking of potential pick-up points. The ranking may include a ranking of items according to probability of successful pick-up and a ranking of points on one item or multiple items according to the probabilities of successful pick-up. In some examples, the different types of rankings may be included in the same list. The ranking model may include one or more deep neural nets that have been trained for ranking the probability of success in pick-up options. The ranking model may provide a set of proposed pick-up strategies including grasps and orientations within the range of the 6DOF robotic arm. Based on the ranking model and proposed pick-up strategies, ranking and decision module 315 decides what to try. Ranking and decision module 315 may then output the decision. Based on the decision, the robotic arm attempts to pick up the specified object at the specified point.

Figure 4:
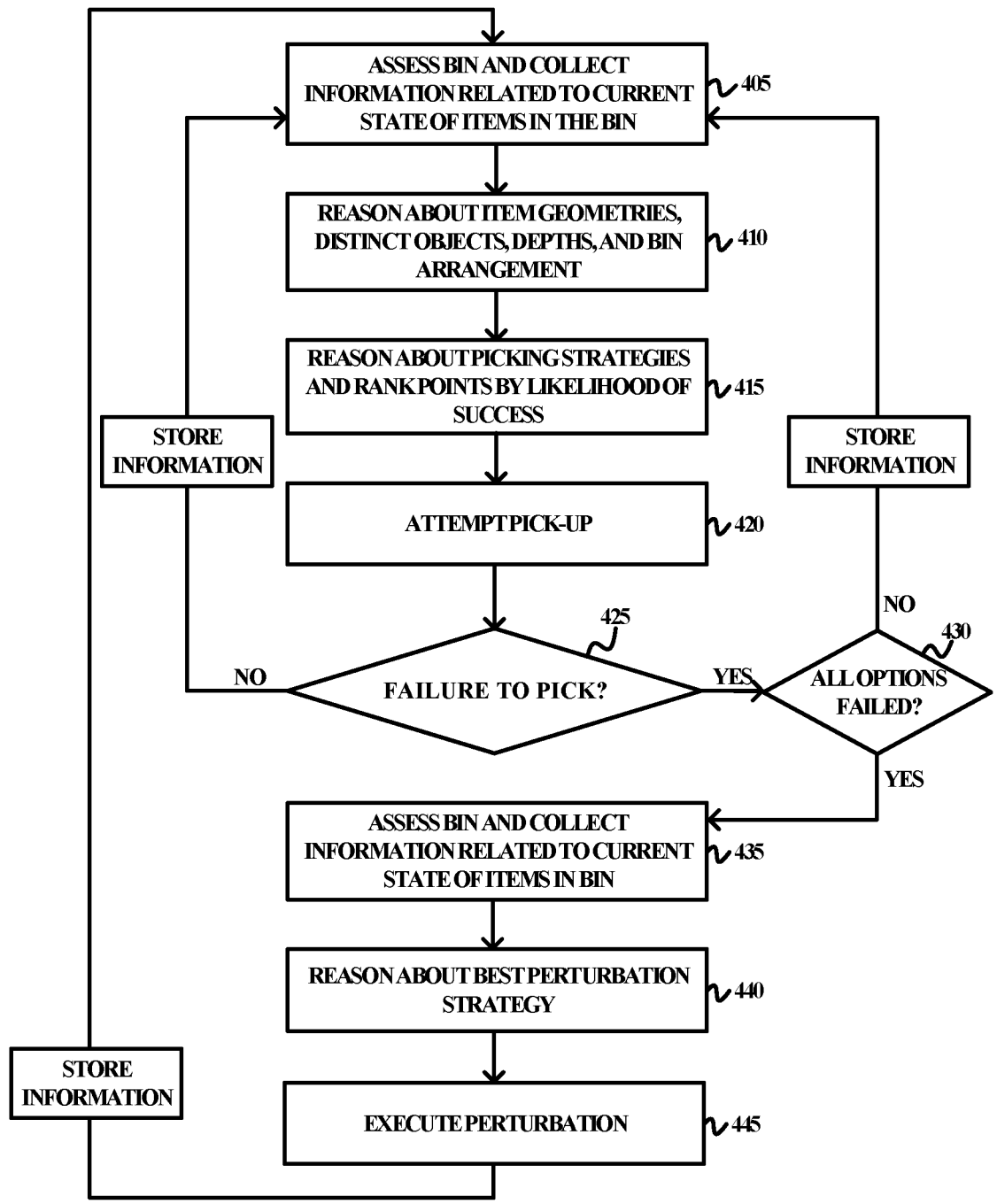
FIG. 4 is a flow chart illustrating an exemplary series of operations for decision-making, picking items, and perturbing items in accordance with some embodiments of the present technology.

FIG. 4 is a flowchart illustrating an exemplary set of operations that a machine may use to pick items from a bin in accordance with some embodiments of the present technology. In step 405, the machine assesses the bin to collect information on the current state of items in the bin. The machine may use visual sensing, imaging, or any other type of sensing helpful for identifying items in the bin. In some examples, the machine takes one or more images using at least one camera to see the arrangement of items in the bin. The machine may use a 3D camera, an RGB camera, or a similar camera or combinations thereof to image the contents of the bin.

In step 410, the machine uses data collected in step 405 to reason about the situation in the bin. In some embodiments, this reasoning includes segmentation. Via segmentation, the machine may reason about or identify distinct objects within the bin. In some examples, segmentation is implemented within a machine learning structure, such as a deep neural net, wherein the machine may learn how to effectively identify distinct objects and subsequently improve at segmentation. After training and over time, the machine may learn from previous failures to continually improve at segmenting out distinct items. During step 410, the machine may further reason about the geometry of distinct objects, the depth or distance of objects with respect to the machine or bin, the material properties of distinct objects, or similar qualities and features including combinations thereof. Similar to segmentation, the machine may comprise an intelligent learning structure that may learn how to effectively reason about the qualities and features mentioned and subsequently improve at identifying them.

In step 415, the machine reasons about the items and points with the highest probability of picking success. Reasoning performed by the machine may be based on knowledge from previous picking experience or attempts. The machine may look for items and for places on the items that have known or learned elements that have historically led to success. For example, referring back to the example of the socks, the machine may search for a flat tag to grab the socks by because it knows from previous experience that the machine is likely to succeed when picking something up by a flat surface. On a given item, the machine may pick a variety of points and reason about which points are better than others for picking up the items up. In certain embodiments, the machine uses a ranking model for both objects and places. Using the ranking model, the machine can rank the items in view by the probability that the machine could successfully pick up each item. Similarly, the machine may rank points on various objects according to the probability of a successful pick-up at that point. Based on the rankings, the machine may produce a set of proposed grasps and orientations to attempt to pick the items. The reasoning performed in step 415 may, similarly to step 410, be implemented in a machine learning structure. Using a trained deep neural net, the machine can learn from previous failures and continually improve at identifying and choosing picking strategies based on the information provided. The grasps and orientations proposed by the machine may be within the full spectrum of motion for the arm, which, in some embodiments, may be a full 6DOF robotic arm comprising a suction-based picking mechanism. As such, a deep neural net may be an effective solution to sorting through the infinite number of possible picking strategies.

In step 420, the machine attempts to pick up an item by the highest ranked (i.e., most promising) point in the bin and move the item to a new location. In some examples, the new location may be a different bin. If the machine is being used to sort items from a bin, the machine may move the item into its corresponding, sorted bin. If the machine successfully picks up the item and moves it to its new location, the machine may continue down the rankings and attempt to pick up an item by the next highest ranked point in the bin.

In step 425, the machine determines if it failed to pick up the item. The machine may be able to sense pick-up failure if it dropped the item or the pick never occurred by determining that a vacuum never formed between the suction element and an item, in the example of the suction-based picking element. If the machine failed to pick up the item, it moves to step 430 to determine if there are more options in the bin to attempt. If there are more options, the machine may attempt to pick up an item by the next highest ranked point. The next highest ranked point may be on the same item or a different item. If every option in the bin has failed (i.e., each item point in the rankings has been attempted), the machine moves on to perturbation. After determining if the machine failed to pick up the item or not, information may be stored related to the last attempt. The information may be then be implemented and used in future attempts.

In step 435, the machine assesses the bin to collect information on the current state of items in the bin. This data may be collected via a camera or similar sensing or imaging method as previously discussed. In step 440, the machine reasons on the best way to perturb the items or a single item in the bin. The machine may pick a perturbation strategy such as targeted or general, continuous or discrete, physical touch or compressed air, and similar options for perturbation. The machine may use its robotic arm to blow air into the bin, stir the bin, knock items down, touch items, or similar perturbation methods, variations, or combinations thereof. Which approach the machine chooses to attempt first may vary depending on the present scenario, previous learning experiences, pre-determined order, or similar protocols. The approach may be based, at least in part, on how many items are left in the bin. Similar to reasoning through steps previously discussed, the reasoning about perturbation strategies may be implemented within a machine learning structure. Using a trained deep neural net, the machine may be able to effectively determine a perturbation strategy with the highest likelihood of success based on what it has learned from previous perturbation failures and continually improve its ability to pick perturbation strategies over time.

Finally, in step 445, the machine executes the determined perturbation strategy. In some scenarios, the machine may then return to step 405 and re-assess the present situation within the bin. Alternatively, the machine may return to a different step, such as re-assessing the bin or a specific item in step 435 and trying a different perturbation strategy. After executing the perturbation strategy, information may be stored about the perturbation strategy and executed method. This information may then be implemented and used in future perturbation methods, in some examples.

Several methods of determining depth, including three-dimensional (3D) imaging, exist and can be used in various-computer vision programs that provide an autonomous device or robot the ability to see or sense the environment around it. Imaging methods useful for a robotic device sometimes use triangulation methods for determining depth. Artificial neural networks can be used to guide computer-vision systems. Training data may be used to teach a neural networks how to apply 3D information to use geometries, depths, and material properties when guiding decisions and actions taken by a robotic device. 3D cameras or scanners can be used for computer-vision in many applications, however, several other types of cameras or imaging devices can also be used to achieve similar results.

In some examples, a 3D camera may project a known pattern onto a region, such as a bin, in order to determine depth. A 3D camera may take a 3D image of an area and the pattern to produce a 3D image. The 3D image may be a 3D scan or similar type of image comprising 3D data. Other 3D imaging techniques may be used to achieve the resulting 3D information. An alternative method for training a DNN to decipher depth may use simulation. The simulated environment provides many opportunities for training in various situations, multiple views, and performing many training sets at a much faster rate than training with real, physical data sets.

Deep neural networks, such as those used in the picking, perturbation, segmentation, ranking, and computer-vision models described herein, are used to learn mapping functions from inputs to outputs. Generating mapping functions is done through DNN training processes. Many various types of training and machine learning methods presently exist and are commonly used including supervised learning, unsupervised learning, reinforcement learning, imitation learning, and many more. During training, the weights in a DNN are continually updated in response to errors, failures, or mistakes. In order to create a robust, working model, training data is used to initially dial in the weights until a sufficiently strong model is found or the learning process gets stuck and is forced to stop. In some implementations, the weights may continue to update throughout use, even after the training period is over, while in other implementations, they may not be allowed to update after the training period.

Training neural networks, in some scenarios, may be the most difficult part of using artificial neural networks. Parameters of a neural network are found using optimization with many, or sometimes infinite, possible solutions. Modern deep learning models, especially for computer vision and image processing, are based on convolutional neural networks, although may also incorporate other deep generative models. As described herein, using artificial neural networks for the picking, perturbation, segmentation, ranking, and computer-vision processes first requires a training process. Most training processes are complex and require a great amount of time. A variety of different training methods may be used to train a robotic arm for intelligently picking and perturbing items in a bin. However, a method for machines to quickly learn a new skill by learning from a few previous mistakes, otherwise known as few-shot training, is disclosed. Few-shot training may be used, in some examples, to train a robotic device to perform tasks, such as the robotic arm of FIG. 1, but may also be used in training artificial neural networks in a wide variety of applications.

Figure 5:
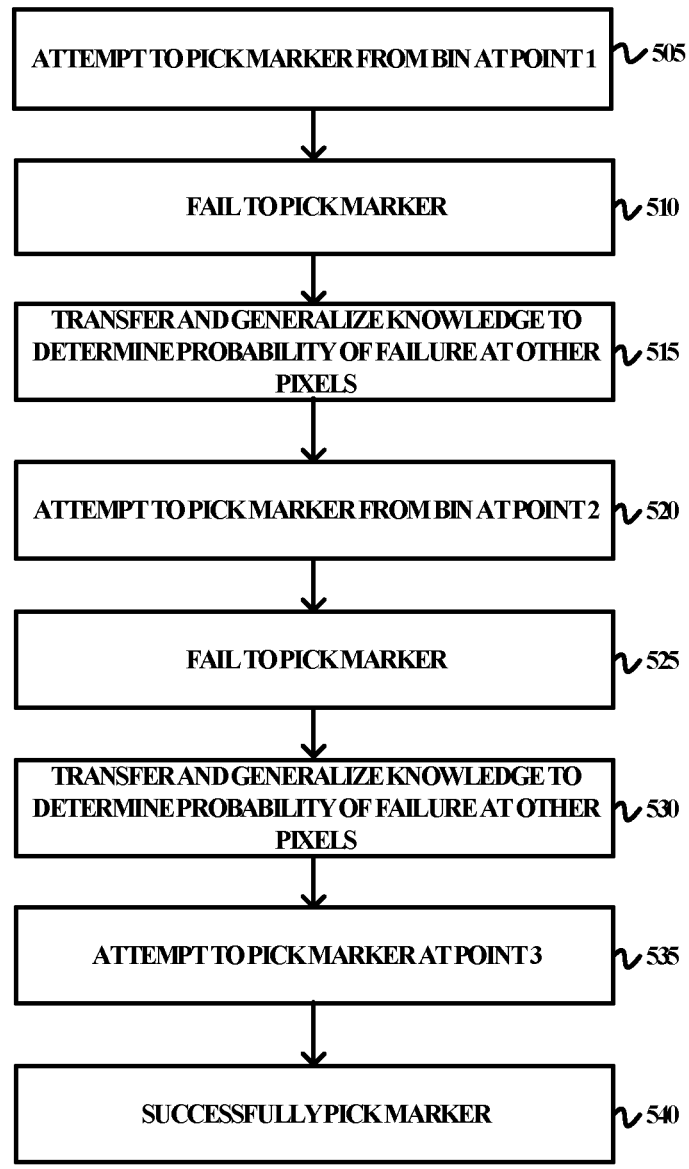
FIG. 5 is a flow chart illustrating an exemplary series of steps in the few-shot training model in accordance with some embodiments of the present technology.

FIG. 5 is a flowchart illustrating an example set of operations for the few-shot training process in reference to the example of FIG. 1. The series of operations may apply to any artificial neural network learning environment and are not intended to be solely for use in robotic devices or item picking. The robotic arm for picking items in a bin is used solely for purposes of explanation. In the few-shot training process, a machine, such as the robotic arm of FIG. 1, uses transference and generalization to learn from failures. Learning from failures in this manner requires far fewer training data sets and trial-and-error attempts than existing neural network training methods.

In step 505, a robotic arm attempts to pick a marker from a bin at point 1. Point 1 may be any point on the marker. For example, point 1 may be a point on the edge of a cap of the marker. In some scenarios, step 505 may be the first time the robotic arm has ever attempted to pick up a marker, while in other examples it may have previously tried to pick up the same marker or a similar marker. In step 510, the robotic arm fails to pick up the marker. Failing to pick up the marker may include never successfully grabbing or creating suction between the picking element and the marker, or may include picking the marker and subsequently dropping it.

After failing to pick up the marker, in step 515, the robotic arm transfers the knowledge gained from the failure and attempts to generalize it to other areas of the marker. For example, if the robotic arm includes a computer-vision system like the one shown in FIG. 1, it may recognize that it attempted to pick the marker by the edge of the cap. The failure at the edge of the marker cap may be generalized to other pixels or regions that contain elements similar to point 1, such as all pixels comprising the edge of the cap. In some examples, the edge of the marker may have infinite points, so if a machine only learned to avoid a single point at a time, it may continue to try other points along the edge of the marker, although they are just as likely to cause the machine to fail to pick up the marker. Thus, any pixels or groups of pixels that appear similar to that of the failure point may be indicated as having a high probability of failure. Other pixels less similar to point 1 may be left unscored or scored with a low probability of failure until the machine learns otherwise.

After rating the other pixels according to their probability of failure, the robotic arm attempts to pick up the marker again, this time at point 2, in step 520. Point 2 is not the same as point 1. In the present example, point 2 is a position that is not already predicted to have a high probability of failure. However, in step 525, the robotic arm fails to pick up the marker. Similar to step 515, in step 530 the machine applies and attempts to generalize the knowledge gained from the second attempt. If, for example, point 2 is on a narrow end of the marker, the pixels that look similar to that of the pixels around point 2 would be known to have a high probability of failure. The knowledge gained in the second attempt is used in conjunction with the knowledge from the first, not in replacement of it. In this manner, the information stored on which areas of the marker are more likely to fail has grown from the previous attempt, leaving fewer spots left for the robot to try to pick from. In this manner, the robot may continue to fail and learn from previous failures until it finds a successful picking point.

The manner in which the machine indicates which pixels have higher probability of failure than others may vary. In some examples, the machine may directly assign a number value to each rated pixel that correlates to their probability of failure, relative probability of failure, or some other arbitrary system to indicating probability of failure. In other examples, the probability of failure may be stored or noted in an entirely different manner such as in a different location, without the use of specific numbers (e.g., on a color mapping), or by groups of pixels rather than individual pixels.

Finally, in step 535 the robotic arm attempts to pick the marker at point 3, wherein point 3 is different from points 1 and 2. In step 540, the robotic arm successfully picks the marker. In the present example, the robotic arm succeeds at a task after only two failed attempts. However, in other examples, a machine may succeed on the first try, second try, fourth try, or on any other attempt. Furthermore, a machine may continue learning about probability of failure after a successful attempt. If the robotic arm had succeeded to pick up the marker first try, but then needed to pick up another similar marker or the same marker again, it may fail trying to pick up the marker at a different point the second time. The machine can then continue to transfer and generalize its knowledge as it continues attempting and failing in this way or in similar manners.

The knowledge that a machine collects on objects can be transferred to other objects with similar qualities. For example, if the machine learns that trying to pick up an item by a small edge typically leads to failure, it may know not to try to pick up an item that it has never seen before by a small edge. The methods of the few-shot learning approach may be implemented in a DNN. The DNN, in some examples, may correlate each pixel. However, in some situations, the same item or a similar item may look very different from other angles or views. In this manner, a DNN may be trained to address this issue. Training a DNN to address this issue, in some scenarios, may include simulation training. In simulation training, a DNN can learn to identify objects from many different angles in a relatively short period of time. Thus, a DNN may already have practice understanding what is the same item and correlating which pixels have a high probability of failure when an item is being viewed from a different angle. In other scenarios, the DNN may not already be trained to understand this transference of knowledge, but may learn to do so via trial-and-error and with further experience.

In an alternative method, a DNN may learn to transfer regions of failure to other pixels using relative motion and position, such as translations and rotations of an object in which a computer may be able to directly correlate a previous position with a new position. This tactic may be especially useful in scenarios where the position of an item changes over time. For example, if the robotic arm is attempting to pick up a marker, such as in the example of FIG. 5, it may accidentally knock the marker over or move its position relative to the machine. In this scenario, the machine may track the relative motion of the marker and transfer the knowledge of certain pixels to their new location in the image. Thus, the new state of the marker does not mean that all previous information learned about the marker has been lost.

In yet another alternative, a system may be trained to transfer and generalize knowledge in the few-shot method using human-labeled data. The human labeled data may directly inform the system of any correspondences between pixels and similar regions in images. Furthermore, real image data, such as real images of various objects may be used to train systems to transfer and generalize knowledge between images or views. Any of the few-shot training methods discussed herein may be used alone or in conjunction with any other training methods discussed or not discussed for the sake of brevity. Other methods of transferring and generalizing knowledge as it pertains to computer vision or artificial neural networks may be used and are anticipated.

As previously mentioned, the applications of few-shot learning expand far beyond the example of a robotic arm picking items from a bin. Few-shot learning may be applied to train a variety of artificial neural networks for various purposes. Any scenario in which information may be learned and transferred or generalized to apply to a wider set of cases may use few-shot training methods to train a system. In some examples, another type of autonomous device for performing various tasks may use few-shot training methods to quickly learn tasks.

The processes described herein may be implemented in several different variations of media including software, hardware, firmware, and variations or combinations thereof. For example, neural net training methods described herein may be implemented in software, while a trained neural net for the picking and perturbation of items may be implemented entirely in hardware and installed in a robotic device. Alternatively, the robotic device may be controlled by a trained neural net implemented entirely in software on an external computing system, or may be implemented as a combination of the two across one or more devices.

Figure 6:
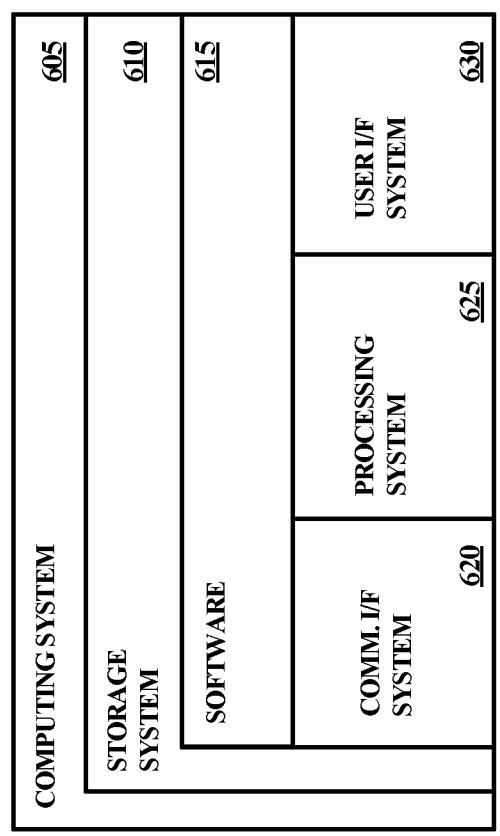
FIG. 6 is an example of a computing system in which some embodiments of the present technology may be utilized.

FIG. 6 illustrates computing system 605 that is representative of any system or collection of systems in which the various processes, programs, services, and scenarios disclosed herein may be implemented. Examples of computing system 605 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 605 may be implemented as a single apparatus, system, or device or may be implemented in a distributed manner as multiple apparatuses, systems, or devices. Computing system 605 may include, but is not limited to, storage system 610, software 615, communication interface system 620, processing system 625, and user interface system 630. Components of computing system 605 may be optional or excluded in certain implementations. Processing system 625 is operatively coupled with storage system 610, communication interface system 620, and user interface system 630, in the present example.

Processing system 625 loads and executes software 615 from storage system 610. Software 615 includes and implements various processes described herein, which is representative of the processes discussed with respect to the preceding Figures. When executed by processing system 625, software 615 directs processing system 625 to operate as described herein for at least the various processes, operational scenarios, and sequences discussed in the foregoing implementations. Computing system 605 may optionally include additional devices, features, or functionality not discussed for purposes of brevity.

Referring still to FIG. 6, processing system 625 may comprise a micro-processor and other circuitry that retrieves and executes software 615 from storage system 610. Processing system 625 may be implemented within a single processing device but may also be distributed across multiple processing devices or sub-systems that cooperate in executing program instructions. Examples of processing system 625 include general purpose central processing units, graphical processing units, application specific processors, and logic devices, as well as any other type of processing device, combinations, or variations thereof.

Storage system 610 may comprise any computer readable storage media readable by processing system 625 and capable of storing software 615. Storage system 610 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 610 may also include computer readable communication media over which at least some of software 615 may be communicated internally or externally. Storage system 610 may be implemented as a single storage device but may also be implemented across multiple storage devices or sub-systems co-located or distributed relative to each other. Storage system 610 may comprise additional elements, such as a controller, capable of communicating with processing system 625 or possibly other systems.

Software 615 may be implemented in program instructions and among other functions may, when executed by processing system 625, direct processing system 625 to operate as described with respect to the various operational scenarios, sequences, and processes illustrated herein. For example, software 615 may include program instructions for implementing a robot control process, neural net training process, decision making process, segmentation process, ranking process, or any other reasoning or operational processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 615 may include additional processes, programs, or components, such as operating system software, robotic control software, computer-vision software, virtualization software, or other application software. Software 615 may also comprise firmware or some other form of machine-readable processing instructions executable by processing system 625.

In general, software 615 may, when loaded into processing system 625 and executed, transform a suitable apparatus, system, or device (of which computing system 605 is representative) overall from a general-purpose computing system into a special-purpose computing system customized for one or more of the various operations or processes described herein. Indeed, encoding software 615 on storage system 610 may transform the physical structure of storage system 610. The specific transformation of the physical structure may depend on various factors in different implementations of this description. Examples of such factors may include, but are not limited to, the technology used to implement the storage media of storage system 610 and whether the computer-storage media are characterized as primary or secondary storage, as well as other factors.

For example, if the computer readable storage media are implemented as semiconductor-based memory, software 615 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 620 may include communication connections and devices that allow for communication with other computing systems (not shown) over communication networks or connections (not shown). Examples of connections and devices that together allow for inter-system communication may include network interface cards, antennas, power amplifiers, radio-frequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 605 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for training an artificial neural network, the method comprising:
   performing, with a robotic picking device, an attempt to pick up an item at a first region on the item, wherein the first region corresponds to a first group of pixels;
   in response to determining that the attempt failed, generalizing information about the first region, wherein the generalized information about the first region includes information about characteristics of the first region and an associated probability of producing the failed attempt based on the characteristics, and wherein the characteristics comprise locational features of the item at the first region with respect to the robotic picking device, one or more other regions on the item, and one or more other items;
   transferring the generalized information about the first region to one or more other regions on the item, wherein transferring the generalized information comprises indicating a probability of failure associated with at least one different group of pixels having one or more of the same characteristics as the first group of pixels;
   identifying a second region on the item to attempt to pick up the item from, wherein the second region is distinct from the first region and the one or more other regions, and wherein the second region corresponds to a second group of pixels lacking at least one characteristic of the first group of pixels;
   performing, with the robotic picking device, a second attempt to pick up the item at the second region on the item;
   in response to determining that the second attempt to pick up the item was unsuccessful, adjusting a probability of failure associated with the second region, identifying a perturbation strategy for repositioning the item based on the characteristics, and performing the perturbation strategy with a perturbation element of the robotic picking device; and
   performing, with the robotic picking device, a third attempt to pick up the item at either the first region or the second region on the item, the first region or the second region selectively chosen based on the probabilities associated with the first region and the second region in a position following perturbation.

2. The method of claim 1, wherein the characteristics of the first region further comprise material properties of the item, a position and orientation of the item, and a shape of the item.

3. The method of claim 1, wherein transferring the generalized information about the first region to the one or more other regions includes generating a probability map of regions on the item, wherein the probability map includes likelihoods that the regions will produce failed picking attempts.

4. The method of claim 2, further comprising determining that the third attempt to pick up the item was successful.

5. The method of claim 1, further comprising:
   transferring the generalized information about the first region on the item to one or more new regions on a different item having at least one matching characteristic to the item.

6. The method of claim 1, wherein the robotic picking device comprises a picking element configured to pick up items.

7. The method of claim 6, wherein the picking element comprises at least one suction cup configured to pick up the items using suction.

8. The method of claim 1, wherein the perturbation element comprises a compressed air valve configured to blow air into the bin to reposition the items.

9. The method of claim 1, wherein the item is in a first position and the method further comprises:
   in response to determining that the item is in a new position, correlating the new position with the first position; and
   identifying the first region on the item in the new position.

10. The method of claim 9, wherein correlating the new position with the first position comprises identifying a relative motion of the item when moving between the first position and the new position to determine a translation and a rotation of the item.

11. A system comprising:
    a robotic picking device;
    one or more computer-readable storage media;
    a processing system operatively coupled to the one or more computer-readable storage media; and
    program instructions, stored on the one or more computer-readable storage media, for training a neural network, wherein the program instructions, when read and executed by the processing system, direct the processing system to:
      perform, with the robotic picking device, an attempt to pick up an item at a first region on the item, wherein the first region corresponds to a first group of pixels;
      in response to determining that the attempt failed, generalize information about the first region, wherein the generalized information about the first region includes information about characteristics of the first region and an associated probability of producing the failed attempt based on the characteristics, and wherein the characteristics comprise locational features of the item at the first region with respect to the robotic picking device, one or more other regions on the item, and one or more other items;
      transfer the generalized information about the first region to one or more other regions on the item, wherein transferring the generalized information comprises indicating a probability of failure associated with at least one different group of pixels having one or more of the same characteristics as the first group of pixels;
      identify a second region on the item to attempt to pick up the item from, wherein the second region is distinct from the first region and the one or more other regions, and wherein the second region corresponds to a second group of pixels lacking at least one characteristic of the first group of pixels;

perform, with the robotic picking device, a second attempt to pick up the item at the second region on the item;

in response to determining that the second attempt to pick up the item was unsuccessful, adjust a probability of failure associated with the second region, identify a perturbation strategy for repositioning the item based on the characteristics, and perform the perturbation strategy with a perturbation element of the robotic picking device; and perform, with the robotic picking device, a third attempt to pick up the item at either the first region or the second region on the item, the first region or the second region selectively chosen based on the probabilities associated with the first region and the second region in a position following perturbation.

12. The system of claim 11, wherein the characteristics of the first region further comprise material properties of the item, a position and orientation of the item, and a shape of the item.

13. The system of claim 11, wherein to transfer the generalized information about the first region to the one or more other regions, the program instructions direct the processing system to generate a probability map of regions on the item, wherein the probability map includes likelihoods that the regions will produce failed picking attempts.

14. The system of claim 12, wherein the program instructions further direct the processing system to determine that the third attempt to pick up the item was successful.

15. The system of claim 11, wherein the program instructions further direct the processing system to transfer the generalized information about the first region on the item to one or more new regions on a different item having at least one matching characteristic to the item.

16. The system of claim 11, wherein the robotic picking device comprises a picking element configured to pick up items.

17. The system of claim 16, wherein the picking element comprises at least one suction cup configured to pick up the items using suction.

18. The system of claim 11, wherein the perturbation element comprises a compressed air valve configured to blow air into an area to reposition the items.

19. The system of claim 11, wherein the item is in a first position and the program instructions further direct the processing system to:

in response to determining that the item is in a new position, correlate the new position with the first position; and identify the first region on the item in the new position.

20. The system of claim 19, wherein to correlate the new position with the first position, the program instructions direct the processing system to identify a relative motion of the item when moving between the first position and the new position to determine a translation and a rotation of the item.

* * * * *